(12) United States Patent
Kim

(10) Patent No.: US 6,871,494 B2
(45) Date of Patent: Mar. 29, 2005

(54) HYDRAULIC TYPE BRAKE APPARATUS

(75) Inventor: Yeon Ho Kim, Kyungsangnam-do (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 45 days.

(21) Appl. No.: 10/410,142

(22) Filed: Apr. 9, 2003

(65) Prior Publication Data

US 2003/0201668 A1 Oct. 30, 2003

(30) Foreign Application Priority Data

Apr. 30, 2002 (KR) ................................. 10-2002-0023762

(51) Int. Cl.[7] ............................................. F16D 31/02
(52) U.S. Cl. ........................................... 60/468; 60/466
(58) Field of Search ................................. 60/466, 468

(56) References Cited

U.S. PATENT DOCUMENTS

| | | | |
|---|---|---|---|
| 5,197,284 A | * 3/1993 | Cartner ........................ | 60/466 |
| 5,325,944 A | 7/1994 | Livingston, Sr. | |
| 5,566,795 A | 10/1996 | Barefoot | |

FOREIGN PATENT DOCUMENTS

| | | |
|---|---|---|
| DE | 2526154 | 12/1976 |
| DE | 19713592 | 10/1998 |
| GB | 2 112 910 | 7/1983 |
| JP | 2000130403 | 5/2000 |

OTHER PUBLICATIONS

English Abstract of DE 19713592 dated Oct. 8, 1998.
English Abstract of DE 2526154 dated Dec. 16, 1976.
English Abstract of JP 2000–130403 dated May 12, 2000.

* cited by examiner

*Primary Examiner*—F. Daniel Lopez
*Assistant Examiner*—Michael Leslie
(74) *Attorney, Agent, or Firm*—Ladas & Parry LLP

(57) ABSTRACT

The present invention relates to a hydraulic type brake system which includes a unit for adjusting a back pressure in a turn driving hydraulic circuit mounted in a construction heavy equipment such as an excavator, etc., and in particular to a hydraulic type brake apparatus which is used together with a relief valve installed various actuator driving hydraulic circuits for adjusting a back pressure in a lower flow side of a relief valve for thereby adjusting an opening pressure of a relief valve. There is provided a back pressure adjusting unit adapted to adjust an opening pressure of the relief valve by adjusting a back pressure of the hydraulic circuit in a lower flow portion of the relief valve based on a co-operation with the actuator.

3 Claims, 3 Drawing Sheets

PRIOR ART

PRIOR ART

HYDRAULIC TYPE BRAKE APPARATUS

BACKGROUND OF THE INVENTION

1. Field of the Invention

The present invention relates to a hydraulic type brake system which includes a unit for adjusting a back pressure in a turn driving hydraulic circuit mounted in a construction heavy equipment such as an excavator, etc., and in particular to a hydraulic type brake apparatus which is used together with a relief valve installed various actuator driving hydraulic circuits for adjusting a back pressure in a lower flow side of a relief valve for thereby adjusting an opening pressure of a relief valve.

2. Description of the Background Art

A relief valve is directed to draining a part or all of a hydraulic oil in a direction of a hydraulic pressure tank for thereby maintaining a pressure of a hydraulic pressure circuit below a set value when the maximum pressure of a hydraulic circuit reaches at a set value of a valve.

FIG. 1 is an inner cross-sectional view of a direct driven type relief valve which is an example of a relief valve.

The relief valve includes an inlet 11 connected to a hydraulic circuit, a poppet 12 adapted to limit a flow of a hydraulic oil flowing from the inlet, a spring 13 adapted to elastically bias a state that the inlet 11 is closed to an initial state by pressurizing the poppet 12, a pressure adjusting unit 154 adapted to adjusting an elastic force of the spring, and an outlet 15 adapted to returning the hydraulic oil to a hydraulic tank.

In a dynamic relationship that a relief valve is operated, the relief valve is operated based on a combined force between a force applied to a water pressure area of the poppet 12 by a pressured of a hydraulic oil in the side of the inlet 11, namely, a force of the spring 13 and a force applied to a water pressure area of the poppet 12 by a pressure of a hydraulic oil in the side of the outlet 15.

Therefore, in the case that the relief valve is opened, the above state represents that the force by the pressure of the hydraulic oil in the side of the inlet 11 is larger than the force of the counter action, and in the case that the relief valve is closed, the above state represents that the force by the pressure of the hydraulic oil in the side of the inlet 11 is smaller that the force of the counter action.

Therefore, the combined pressure of the pressure by the force of the spring 13 and the pressure of the hydraulic oil in the side of the outlet 15 is an opening pressure. When the pressure of the hydraulic oil in the side of the inlet 11 exceeds the opening pressure, the relief valve is opened.

FIG. 2 is a hydraulic circuit of the conventional hydraulic brake.

As shown therein, there are provided a hydraulic pump 21, a hydraulic motor 27 driven by a hydraulic oil discharged from the hydraulic pump 21, and a direction changing valve 22 which is switched when a signal pressure is applied to a flowing path between the hydraulic pump 21 and the hydraulic motor 27 for thereby controlling a flowing direction of a hydraulic oil supplied to the hydraulic motor 27.

There are provided a pair of relief valves 23 which are installed in a pipe path connecting main pipe paths 25 and 26 in parallel which connect the direction changing valve 22 and the hydraulic motor 27, and a pair of check valves 24 which are installed in another pipe path connecting the main pipe paths 25 and 26 in parallel. An intermediate portion of the pipe path in which the relief valve 23 is installed and an intermediate portion in which the check valve 24 is installed are connected each other and opened.

The operation of the hydraulic circuit will be described. The pressure oil discharged from the hydraulic pump 21 is switched in its supply direction by the operation signals 30a and 30b of the hydraulic motor, and the pressure oil flowing through the direction changing valve 22 is directed to driving the hydraulic motor 27 based on the switched direction. The pressure oil which drives the hydraulic motor 27 flows to the hydraulic tank 28 through the direction changing valve 22.

When the direction changing valve 22 is switched to an intermediate position for stopping the hydraulic motor 27, the hydraulic motor driving circuit connected to the direction changing valve 22 becomes the closed circuit 29, so that a high pressure hydraulic oil adapted to rotate the hydraulic motor 27 stays in one side of the main pipe paths 25 and 26, and since the hydraulic motor 27 has a certain rotational force by the inertia force, the hydraulic motor 27 has a role of the hydraulic pump.

Therefore, the hydraulic pressure of the main pipe path 25 or 26 which has a high pressure hydraulic oil is sharply increased, and when the hydraulic pressure exceeds a set pressure of the relief valve 23, the relief valve 23 is opened, and the hydraulic motor 27 is stopped while the pressure oil circulates in the closed circuit 29.

The relief valve performs a function for limiting the maximum pressure of the hydraulic circuit based on the above operation and operates a based on a counter force with respect to the rotational force by the inertia force in the stopped state for thereby implementing a hydraulic braking effect. Therefore, in order to enhance a braking effect, it is important to increase the set value of the relief valve. In this case, it is not needed to increase the set value of the relief valve for only obtaining a braking effect. Namely, in the relationship between the turning system and the hydraulic circuit, a proper set value of the relief valve is determined.

It is difficult to adjust the set value of the relief valve for implementing a desired braking effect based on the above limit with respect to the set value of the relief valve. In addition, an over move-back phenomenon occurs in the turn due to a lack of a braking force during a stop of turn in a construction heavy equipment which uses the turning system, so that it is difficult to operate for thereby causing a safety accident.

SUMMARY OF THE INVENTION

Accordingly, it is an object of the present invention to provide a hydraulic brake apparatus in which it is possible to use a set value of a relief valve during a turning operation based on a characteristic that an opening pressure of a relief valve is increased in accordance with the size of a back pressure which is a pressure in the side of an outlet of a relief valve, and there is provided a unit for increasing the back pressure in the side of the outlet of a relief valve during the stop of the turn for thereby decreasing a turn move-back degree by increasing a braking force by increasing an opening pressure of a relief valve.

To achieve the above objects, there is provided a hydraulic brake apparatus which includes a relief valve adapted to open a hydraulic circuit in the case that a pressure difference between an inlet and an outlet exceeds a set pressure, and a back pressure adjusting unit adapted to adjust an opening pressure of a relief valve by adjusting a back pressure of a hydraulic circuit in a lower flow portion of the relief valve.

In the present invention, as the above back pressure adjusting unit, a switch throttling valve may be used, and the switch throttling valve is switched by a hydraulic signal or electric signal.

In addition, in the above circuit, there is provided a hydraulic circuit opening an opening pressure of a relief valve and a force of the braking force and decreasing a turn move-back degree by providing a unit capable of using a set value of a relief valve during a turn operation and increasing a back pressure in the side of the outlet of the relief valve during a stop of a turn.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiment of the present invention will be described with reference to the accompanying drawings.

Figure 1:
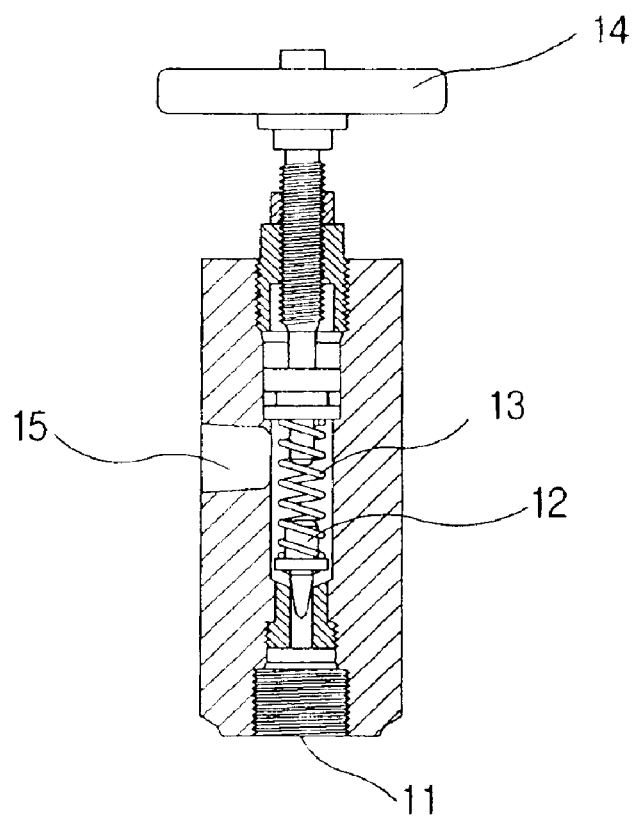
FIG. 1 is an inner cross-sectional view illustrating a conventional relief valve.
Figure 2:
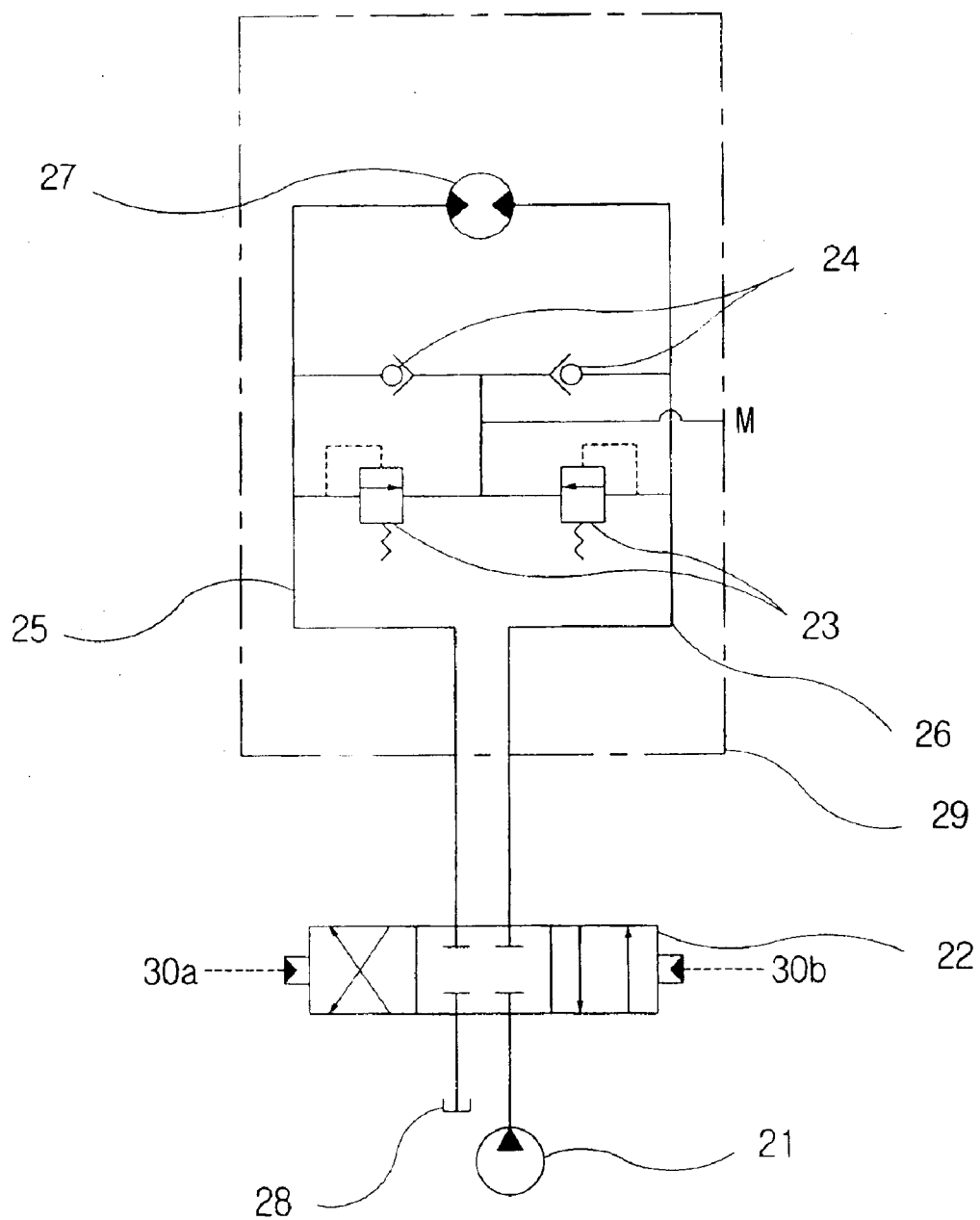
FIG. 2 is a hydraulic circuit diagram illustrating a conventional turn driving hydraulic brake.
Figure 3:
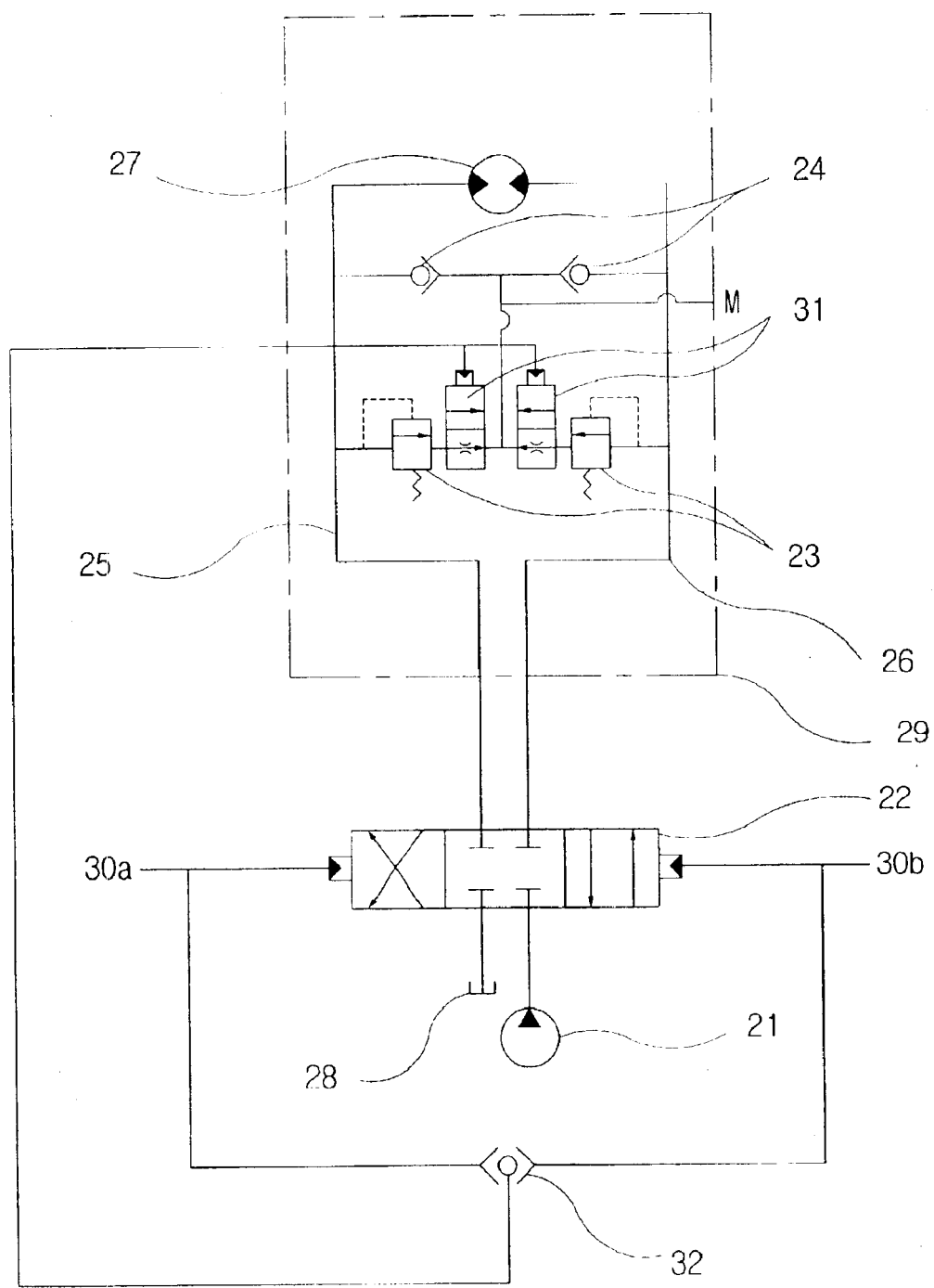
FIG. 3 is a hydraulic circuit diagram illustrating a hydraulic brake apparatus according to the present invention.

FIG. 3 is a hydraulic circuit diagram illustrating a hydraulic brake apparatus according to the present invention. As shown therein, in the conventional hydraulic brake apparatus of FIG. 2, there is further provided a switch throttling valve in a lower flow portion of a relief valve.

The description of the elements same as the conventional art will be omitted. The elements same as the conventional art will be given the same reference numerals.

In the functions of the hydraulic circuit, when the direction changing valve 22 is switched to a neutral position for stopping the hydraulic motor 27, a pilot signal pressure of the direction changing valve 22 is in parallel in a bi-directional check valve 32, and the bi-directional check valve 32 is connected with a pilot port of the switching throttling valve 31. As the directional changing valve 22 is switched to a neutral position, the switching throttle valve 31 is switched in a throttling state. The switched throttling state increases the pressure in the upper flow side (lower flow side of the relief valve) of the switching throttling valve 31. The switching throttling valve 31 may be switched by a hydraulic signal or electric signal.

Therefore, the opening pressure of the relief valve 23 is increased based on the size of the back pressure in the lower flow side of the relief valve 23, and the pressure of the hydraulic circuit is increased by as much as the increased pressure, so that the braking force with respect to the rotational inertia force is increased.

Namely, there is provided a certain unit in such a manner that during the turn operation, the set value of the relief valve 23 is used, and during the turn stop operation, the back pressure of the outlet of the relief valve 23 is increased. Therefore, the opening pressure of the relief valve 23 is increased, and the braking force is increased for thereby decreasing the turn move-back degree.

In the above-described principle, the back pressure is increased in the same manner as the cylinder and pneumatic circuit in the hydraulic actuator for thereby increasing a braking force.

As described above, in the hydraulic brake apparatus according to the present invention, the back pressure adjusting unit is switched based on a cooperation with a driving operation of the actuator. In particular, when the actuator is stopped, the set value of the relief valve is increased, so that the set value of the relief valve is increased. Therefore, the increased set value operates as a set value of the hydraulic brake during the stop of the actuator.

Therefore, the function of the hydraulic brake is implemented at a higher set value before the back pressure of the relief valve is increased, and the force against the turn inertia force is increased, and a larger brake effect is obtained.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In an hydraulic circuit which includes an hydraulic pump, an actuator extended with the hydraulic pump and driven, and a relief valve installed in a flow path connecting flow paths connected in parallel between the hydraulic pump and the actuator, a hydraulic brake apparatus, comprising:

a back pressure adjusting means adapted to adjust an opening pressure of the relief valve by adjusting a back pressure of the hydraulic circuit in a lower flow portion of the relief valve based on a co-operation with the actuator, wherein said back pressure adjusting means is a switch throttling valve.

2. The apparatus of claim 1, wherein said switch throttling valve is switched by a hydraulic signal.

3. In an hydraulic circuit having an hydraulic pump, an actuator driven with the hydraulic pump, and a relief valve in a flow path connecting parallel flow paths between the hydraulic pump and the actuator, the improvement comprising:

means comprising a switch throttling valve for adjusting an opening pressure of the relief valve.

* * * * *